Patented June 4, 1946

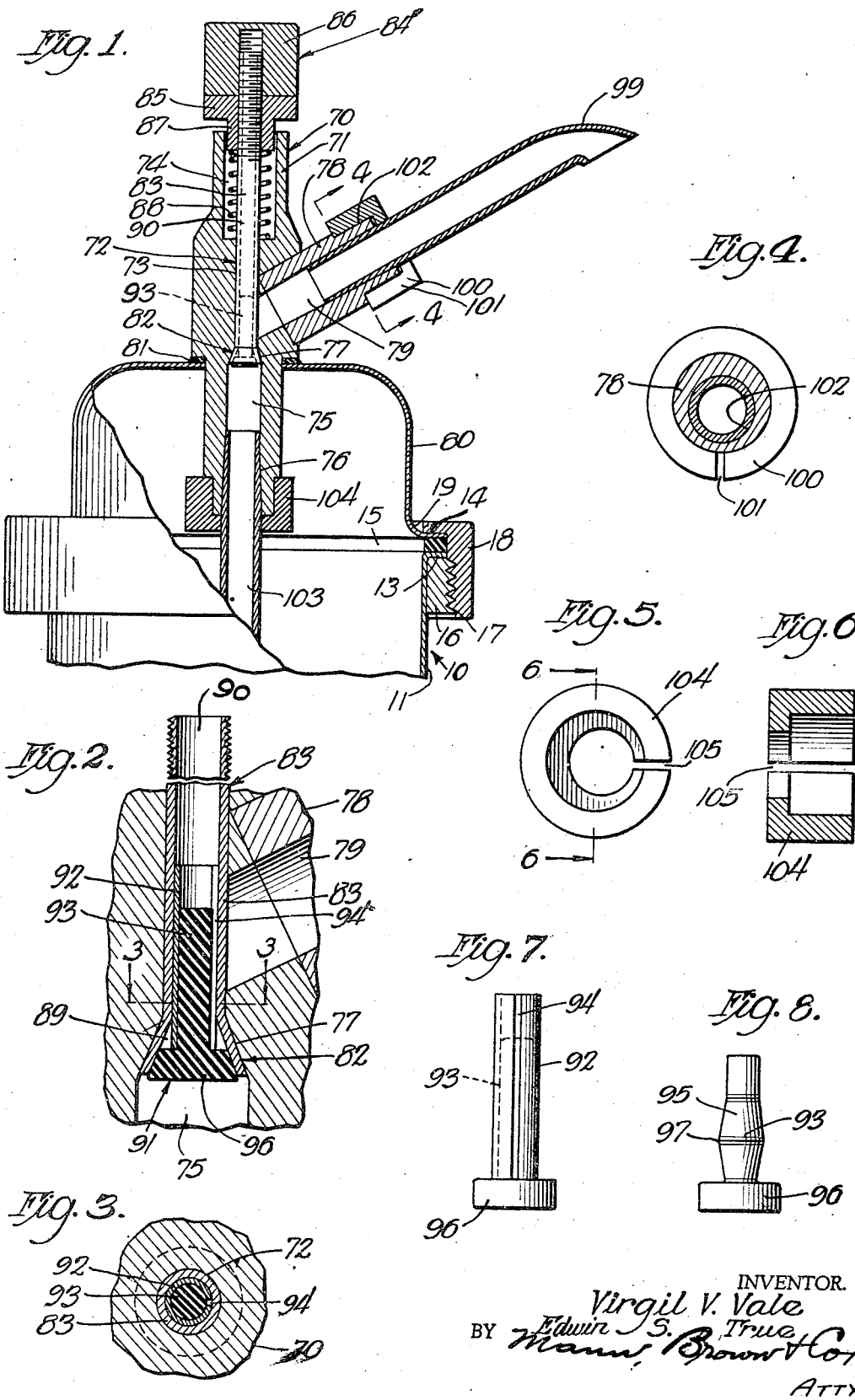

2,401,391

UNITED STATES PATENT OFFICE 2,401,391

VALVE FOR DISPENSERS

Virgil V. Vale and Edwin S. True, Oak Park, Ill.; said True assignor to said Vale Application November 10, 1941, Serial No. 418,500

3 Claims. (Cl. 251—119)

There are on the market today a large number of mixing and dispensing devices for food products, such as whipped cream and the like. These devices usually include a container for the cream or other liquid, with some means for creating a pressure inside the container so that upon opening a valve in a passage through the outer wall of the container the cream or other liquid is forced through this passage and ejected from the container.

At the present time the use of these devices in restaurants and at soda fountains for dispensing whipped cream is greatly restricted due to the fact that considerable resistance to their use has arisen among the members of boards of health in a large number of municipalities. The reason for this resistance is based largely on the fact that it is extremely difficult to keep clean the devices now in use.

In all of these devices it is the general practice to employ gaskets made of rubber, or some fibrous material, to seal the numerous joints between the various parts, and it is common practice to employ a valve made of some such fibrous material or rubber. Screw-threaded joints are commonly used for fastening the various members together. Cream and other food products used in the present dispensers collect in the threads at the joints and penetrate into the fibrous materials used in the gaskets and valves to the extent that it has been impossible to maintain the dispensing devices in a clean and sanitary condition. Even after these devices are thoroughly scoured and washed in hot soapy water they are not entirely clean, because deposits of the food build up in the crevices in the threaded joints, and, to some extent, the liquids are absorbed by the gasket and valve material, requiring these parts to be replaced frequently. The threaded connections can be kept clean only by the use of brushes, or like instruments, employed during the washing process, and experience has shown that such care is seldom exercised by soda fountain employes and employes in restaurants, where these devices would be used most.

Recognizing all of these faulty conditions in previously known dispensing devices of this nature, we have designed a mixing and dispensing receptacle which effectively eliminates all of these obstacles.

Our device is particularly well suited for dispensing whipped cream. It employs nitrous oxide, or other suitable gas, to froth or whip the unwhipped cream in the container, and, being under an initial pressure of approximately 150 pounds, the gas forces the whipped cream out of the container when the pressure inside the container is released. Thus our device both whips and dispenses cream. It has many other uses for which it is equally as well suited, as, for example, it very effectively dispenses beer and carbonated water.

We have designed a mixing and dispensing receptacle for charging or frothing liquids in which a minimum number of threaded joints are employed, and which is entirely devoid of screwthreads coming in contact with the liquids in this container and as nearly as possible is free from gaskets and surface crevices exposed to the liquid; to provide a sturdy, simple and inexpensive device of this character with a minimum number of parts, the minimum number of pockets and crevices exposed to the liquid, and one which is efficient in its operation, sanitary and simple to clean; and to provide a simple and effective means for attaching various parts to the container and sealing same without the use of threaded joints and gaskets.

The principal object of the present invention is to provide a novel valve construction for use in mixing and dispensing receptacles. Other objects and advantages will become apparent from the following description and drawing, in which Fig. 1 is a fragmentary vertical sectional view through the upper portion of a dispenser showing a valve arrangement;

Fig. 2 is an enlarged vertical sectional view through a portion of the dispenser showing the valve arrangement disclosed in Fig. 1;

Fig. 3 is a horizontal sectional view taken on the line 3—3 of Fig. 2;

Fig. 4 is a transverse sectional view taken on the line 4—4 of Fig. 1;

Fig. 5 is an enlarged detail view of the eccentric lock nut employed for fastening the spout and the inner tube to the head of the dispenser;

Fig. 6 is a sectional view taken on line 6—6 of Fig. 5;

Fig. 7 is an enlarged detail view of the valve assembly housed in the lower part of the hollow valve stem; and Fig. 8 is a side elevational view of the rubber insert forming part of the valve assembly shown in Fig. 7.

This application is a continuation in part of the copending application Ser. No. 381,432, filed March 3, 1941.

For the purpose of complying with section 4888 of the Revised Statutes, a specific embodiment of the present invention is shown and described herein, but obviously many modifications may be made without departing from the scope of the invention.

Referring to Fig. 1 of the drawing, the invention is disclosed in the form of a valve mounted in a container generally indicated at 10, having a lower receptacle portion 11 opening upwardly with a cover 80 adapted to close the opening. The receptacle 11 has an outwardly extending flange 13 surrounding the opening, and the cover 80 is flanged at 14. The cover 80 is removable, and, when closed, a gasket 15 of gum rubber, or other suitable material, seals the joint between the cover and the receptacle 11.

The receptacle 11 and the cover 80 are made of some hard, non-corrosive material such as stainless steel so that it can be easily cleaned and will be substantially impervious to scratching and chemical attack by the various fluids to be handled by the device.

Surrounding the opening in the receptacle 11, directly below the lip or flange 13, is a collar, preferably of brass or like material, which can be threaded readily, as shown at 17. An internally threaded ring 18 is carried by the cover 80.

In the form shown in Fig. 1, the gas is introduced into the container through the same passage through which the cream passes, as will be presently described. Extending through the top of the cover 80 is a valve and spout or head assembly generally indicated at 70.

Referring to Fig. 1, the head 70 comprises a body portion 71, which as shown is vertical, having a main vertical passage generally indicated at 72 passing therethrough. This passage 72 is made up of a central portion 73 of uniform cross section having an upper portion 74 with a uniformly larger diameter and a lower portion 75 having a diameter larger than that of the central portion 73 but, as shown, smaller than that of the upper portion 74. The lower part of the passage 75 is flared at 76, and between passages 75 and 73 is a tapered valve seat 77.

Extending obliquely from the head 70 is an arm 78 having a passage 79 therethrough communicating with the central passage 73. The passage 79 is flared outwardly as best shown in Fig. 1, and opens to the atmosphere.

The head 70 is suitably sealed to the container top 80 and, as shown, is silver soldered, as indicated at 81, to make this seal.

In the vertical passage 72 is a valve 82 seated against the taper valve seat 77, and projecting upwardly from this valve is a valve stem 83 extending through the passages 73 and 74 and projecting above the upper end of the head 70. A cap, generally indicated at 84, is threaded or otherwise secured to the top of the stem 83 and, as shown, this cap is made up of two parts 85 and 86, the latter of which covers the top of the valve stem 83. The lower portion 85 of the cap 84 has a flange 87 projecting downwardly therefrom into the enlarged passage 74, and between the lower face of this flange 87 and the bottom of the enlarged passage 74 is a coil spring 88 adapted to apply normally an upward force against the cap 84.

The valve 82 has a passage 89 therethrough, the sides of which are tapered to correspond to the taper of the valve seat 77. The stem 83 has a passage 90 extending upwardly therethrough entirely throughout the extent of the length of the stem.

As best shown in Fig. 2, a valve core 91 is inserted in the passage 90 in valve stem 83. This core comprises a split sleeve 92 and a resilient core member 93. The split in the sleeve 92 is shown at 94 in Fig. 7. The resilient core member 93 is best shown in Fig. 8 and comprises a shank 95 and a cross member 96, the former of which is enlarged at 97 so that when it is inserted in the sleeve 92 it provides a tight fit. This enlarged portion straightens out when it is inserted in the sleeve, as best shown in Fig. 2. The cross member 96 (Fig. 2) is so arranged that when the core is inserted in the passage the said member engages the inner face of the tapered passage 89, thereby closing the passage.

When the elements are assembled, as shown in Fig. 1, the spring 88 maintains the valve 82 in closed position. Thus, the primary passage consisting of the lower portion 75, intermediate portion 72, and the discharge passage 79, is closed by the valve 82.

When it is desired to insert gas into the container, the top portion of the cap 84 is removed and the proper connection is made at the top of the stem 83. The gas, being under pressure, flows downwardly through the passage in the stem and through the slit 94 (Fig. 7) in the valve core sleeve. The gas accumulates in the chamber 89 (Fig. 2) against the inner face of the cross member 96 of the resilient core member 91, and when this pressure is sufficient it causes this resilient core member 96 to bend downwardly to open slightly the passage into the chamber 75 (Fig. 1), thereby allowing the gas to flow downwardly into the container. When the proper amount of gas has been fed into the container, the supply is removed from the top of the stem 83, and the gas pressure on the inside of the container immediately causes the cross member 96 of the resilient core member 91 to return to its normal horizontal position shown in Fig. 2, thereby again sealing the passage through the stem.

The flow of the whipped cream or other contents intended to be discharged from the container is manipulated by applying pressure to the head 84 overcoming the force of spring 88, thereby moving the valve 82 to open the primary passage.

As shown in Fig. 1, the discharge spout indicated at 99 is substantially straight throughout its entire length, thereby making it easy to clean. This spout is fastened to the arm 78 of the head 70 by a lock nut 100. The wall of the lock nut 100 is split at 101 (see Fig. 4). In this manner, the lock nut has a certain amount of resiliency so that when it is applied to the arm 70 for the purpose of locking the spout 99 in place the eccentric hole 102 through the lock nut can be varied slightly in diameter during the locking process. This facilitates the wedging together of the co-operating surfaces and greatly simplifies the action of this lock nut.

The spout 103 extending downwardly into the container from the head 70 is fastened to the head by means of lock nut 104 operating on exactly the same principle as previously described with respect to lock nut 100. This lock nut 104 is best shown in Fig. 6, and it, likewise, is split at 105 for the same reasons explained above.

The device is thus entirely taken apart and all of its parts can be thoroughly washed before they are again assembled. Because of the absence of exposed threads and other surface irregularities causing small crevices, there is no opportunity for cream and other fluids used in this device to become deposited. The device is designed from top to bottom with the thought in mind of making it easy to clean, simple to take apart and assemble, light in weight, and easy to handle.

We claim:

1. For use in a device of the class described, a tapered valve, a valve stem attached to the valve, the valve and the stem having a passage therethrough, a split sleeve in the passage adjacent to the valve end having the edges of the split portion slightly spaced from each other, and a removable resilient valve core in the sleeve adapted to close the passage.

2. For use in a device of the class described, a movable valve, a valve stem attached to the valve, the valve and the stem having a passage therethrough, a split sleeve fixed in the passage adjacent to the valve having the edges of the split portion slightly spaced from each other, and a removable resilient valve core in the sleeve adapted to close the passage.

3. For use in a device of the class described, a valve, a valve stem attached to the valve, the valve and the stem having a passage therethrough, a sleeve in the passage adjacent to the valve end, a removable resilient valve core in the sleeve adapted to close the passage, and passage means in the sleeve between the valve stem and the valve core for the flow of fluid from the first passage past the valve core.

VIRGIL V. VALE.
EDWIN S. TRUE.